INVENTOR.
WILLIAM M. ADKISSON
BY George H Fisher
ATTORNEY

Oct. 29, 1957  W. M. ADKISSON  2,811,325
COURSE CONTROL APPARATUS
Filed Sept. 11, 1952  4 Sheets-Sheet 4

INVENTOR.
WILLIAM M. ADKISSON
BY
George H. Fisher
ATTORNEY

United States Patent Office 2,811,325
Patented Oct. 29, 1957

2,811,325

COURSE CONTROL APPARATUS

William M. Adkisson, Minneapolis, Minn., assignor to Minneapolis-Honeywell Regulator Company, Minneapolis, Minn., a corporation of Delaware Application September 11, 1952, Serial No. 309,056

15 Claims. (Cl. 244—7)

This invention relates to the field of aviation, and more particularly to apparatus for controlling the flight of an aircraft in response to radio signals, so that it follows a desired path over the ground.

A broad general object of the invention is to provide improved radio control apparatus for dirigible craft.

Another broad object of the invention is to provide such radio control apparatus having means for adjusting the sensitivity of the apparatus to a low value, to simplify bringing the craft onto a desired path, or to a high value, to maintain high accuracy in the movement of the craft once it has come onto the desired path.

A more specific object of the invention is to provide, in apparatus controlling the movement of a dirigible craft in accordance with the time relation between trains of pulses of electromagnetic energy, means for delaying the pulses of one train by an amount equal to one-half the pulse repetition period, to modify the sensitivity of the apparatus.

A further object of the invention is to improve control apparatus of the type which gives a cyclically varying output, having oppositely directed rapidly changing and slowly changing portions, upon change in the position of a craft relative to a desired path, by providing means operative to shift the control point of the apparatus from a normal location at the center of the rapidly changing portion to a location at the center of the slowly changing portion, without changing the sense of the output.

The utility of the apparatus is not limited to aircraft control, and another object of the invention is to provide improved apparatus controlling a condition in accordance with the time sequence and the time difference between corresponding voltage pulses of two trains, determined in time by components of a condition to be controlled, in which the sensitivity of the apparatus may be modified by arbitrarily delaying the pulses of one of the trains.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention. In the drawing:

Figures 4, 9:
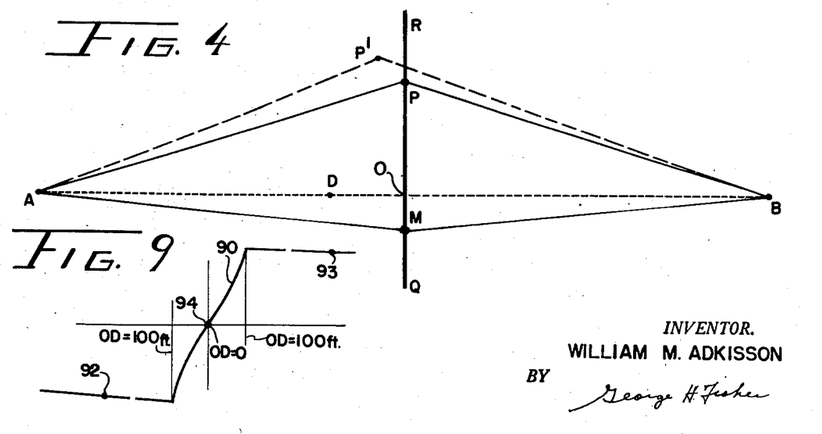
Figures 4 through 14 inclusive, are diagrams illustrative of the operation of the invention.

The general function of the apparatus is best shown in Figure 4, where the line QR represents a ground path along which it is desired to have an aircraft move. In the practice of the invention a master station M is located at a convenient point preferably along the line QR, and first and second slave stations A and B are located on opposite sides of the line QR and are preferably equidistant from it. A radio signal in the form of a train of pulses is radiated from master station M, and is received at slave stations A and B. The equipment of each of the slave stations includes a transmitter for reradiating the received pulses after a delay interval determined by the circuits at the slave station: one or more of these slave stations may include variable delay means, to compensate for minor inequalities between the distance MA and the distance MB, so that the pulses received in a craft located on the line QR from the two slave stations are exactly synchronized.

As long as the craft to be controlled is located at some point P which lies on the line QR the pulses received from slave stations A and B are also synchronized, because the distances AP and BP are equal. If the craft is located at some point P' not on the line QR, the pulses are no longer synchronized, because the distance AP' is less than the distance BP', and accordingly each pulse from station A reaches the craft at P' sooner than the corresponding pulse from station B. The time interval between corresponding pulses as received at the craft may therefore be used to indicate departure of the craft from the desired path.

Figure 2:
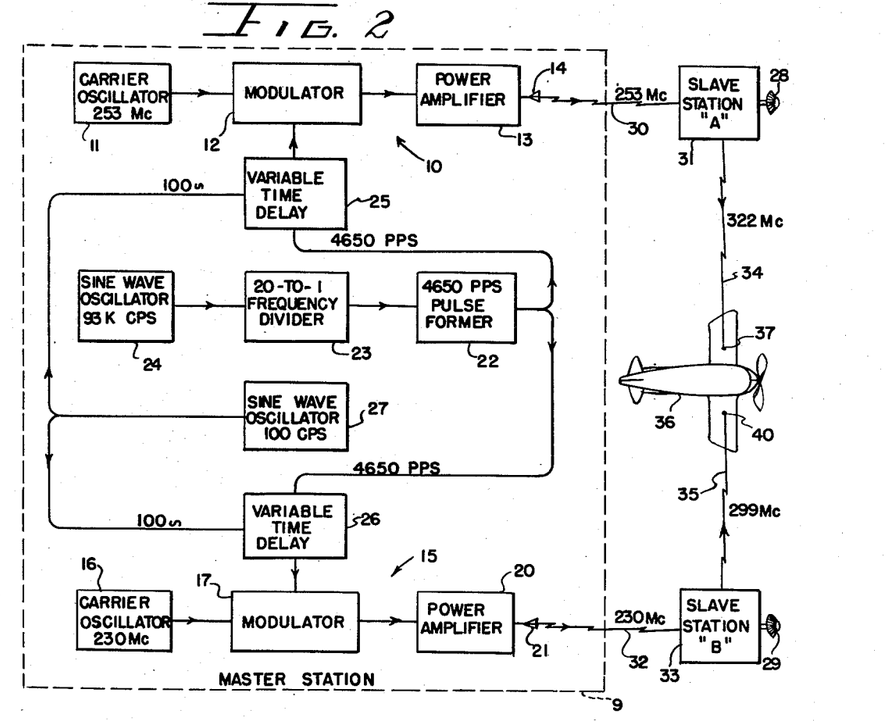

One satisfactory embodiment of the invention is suggested by the block diagram of Figure 2. A first transmitter 10 is shown to comprise a carrier oscillator 11 operating at 253 megacycles, a modulator 12, and a power amplifier 13 which energizes a transmitting antennae 14. A second transmitter 15 is shown to comprise a carrier oscillator 16 operating at a frequency of 230 megacycles per second, a modulator 17, and a power amplifier 20 energizing a transmitting antenna 21.

Modulators 12 and 17 are supplied with modulating voltage in the form of a train of pulses which comprise the output of a pulse former 22. In order that the pulses may be accurately timed, the input to pulse former 22 is supplied through a 20 to 1 frequency divider 23 from a sine wave oscillator 24, the frequency of the latter being controlled by an accurately ground piezoelectric crystal. The frequency of the crystal is selected to be numerically equal, in cycles per second, to one-half the speed of propagation of electromagnetic radiation, in miles per second. To an approximation sufficiently close for the purposes of this discussion, the speed of light is 186,000 miles per second, and therefore the frequency to which the crystal controlling oscillator 24 is ground is 93 kilocycles per second. This results in an output from pulse former 22 of 4,650 pulses per second.

The pulses from pulse former 22 are supplied to modulators 12 and 17 through variable time delay devices 25 and 26 respectively, connected for energization from a sine wave oscillator 27 having a frequency of 100 cycles per second.

Devices 25 and 26 are of such a nature that when no signal is supplied to them from oscillator 27, they introduce equal time delays in the pulse trains supplied to modulators 12 and 17 from pulse former 22. Under these conditions, the trains of pulses radiated on the carriers of the two transmitters are exactly in synchronism when radiated, and if the distances MA and MB are exactly equal, the pulses will be received at the two slave stations at exactly the same instance.

Slave stations A and B can be considered as means for retransmitting, on new carriers, intelligence received at the stations on the original carriers: in the present case the intelligence comprises the pulses modulating the initial carriers. Each station is constructed so that the interval between the reception of a pulse modulated on the initial carrier and the appearance of a new pulse on a new carrier at the transmitter of the slave station is always the same, and the two intervals in the two slave stations can be made very exactly equal, or sufficiently unequal to compensate for any slight unequality in the distances MA and MB, so that the pulses on the new carrier frequencies radiated from slave stations A and B are in exact synchronism, although they now appear as modulations on two new carriers of 322 and 299 megacycles frequency respectively. In Figure 2 the radio link between transmitter 10 and slave station A is indicated by the reference numeral 30, the slave station by the reference numeral 31, and the radio link between the slave station and the aircraft by the reference numeral 34. Similarly the radio link between transmitter 15 and slave station B is indicated by the reference numeral 32, the slave station by the reference numeral 33 and the radio link between slave station B and the aircraft by the reference numeral 35. The delay adjustments for stations A and B are shown at 28 and 29 respectively.

Figure 1:
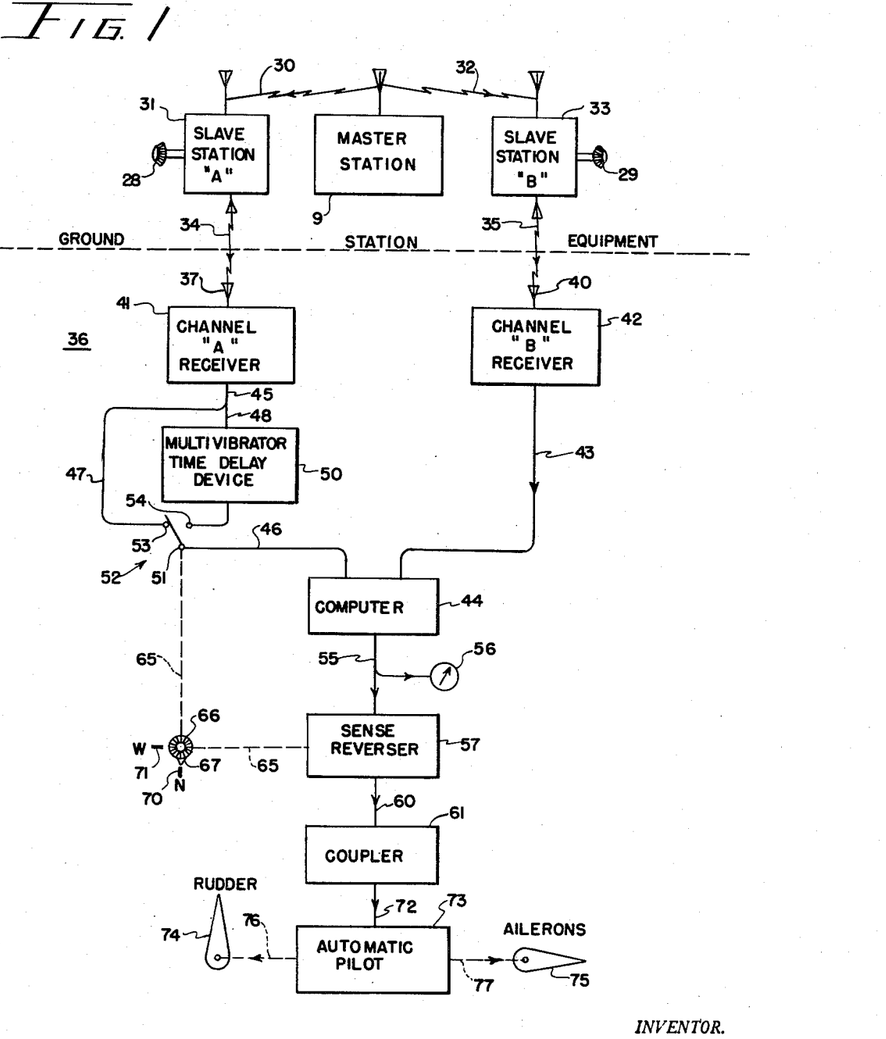
Figures 1 and 2 are schematic showings of the overall system, the former giving more details of the airborne apparatus and the latter giving more details of the ground station equipment.

The aircraft is indicated by the reference numeral 36, and is provided with a pair of receiving antennas 37 and 40. As best shown in Figure 1, antenna 37 is connected to a first receiver 41, and antenna 40 is connected to a second receiver 42. The output 43 from a receiver 42 is supplied directly to a computer 44. The output 45 of receiver 41 is supplied at 46 to computer 44 either through a direct connection 47, or through an alternative connection 48 including multivibrator time delay circuit 50, according as the movable contact 51 of a single pole double throw switch 52 is in engagement with a first fixed contact 53 or a second fixed contact 54.

Computer 44 may be of the type described in Buehler Patent 2,514,369. It may generally be described as a pair of triggered integrators, one of which is set in operation by the appearance of an A pulse at 46 and cut off by the appearance of a B pulse at 43, and the other being cut off by the appearance of an A pulse at 46 and turned on by the appearance of a B pulse at 43. The output 55 of computer 44 is the sum of the integrator outputs, and may be indicated on a conventional D. C. meter 56. Output 55 is also supplied to a sense reverser 57, the output 60 of which energizes a coupler 61.

Sense reverser 57 and movable contact 51 of switch 52 are simultaneously actuated through a mechanical connection 65 by means of a manual knob 66 carrying an index 67. The normal condition of the switch is that shown in Figure 1, when delay network 50 is not included in the circuit, and where the sense reverser is not reversing the sense of the coupler signal: under these conditions index 67 indicates at 70 that the craft is under control with respect to a "narrow" course. When the knob is turned to its other position, the time delay circuit is interposed between receiver 41 and computer 44, and the sense reverser acts to reverse the sense of the computer output: index 67 indicates at 71 that the craft is arranged for control in accordance with a "wide" course.

Coupler 61 functions to provide an output 72 suitable for controlling the operation of an automatic pilot 73, when supplied at its input terminals with a signal of the type supplied by computer 44. Coupling devices of this sort are well known in the art. One suitable arrangement is that disclosed in the co-pending application of Alderson et al., Serial No. 49,442, filed September 15, 1948, and assigned to the assignee of the present invention.

That co-pending application also includes the pertinent details of an automatic pilot capable of functioning as shown in Figure 1 to control the rudder 74 and ailerons 75 of the craft through mechanical connections 76 and 77 respectively, in accordance with the signal supplied at 72.

Referring now to Figure 4, consider a craft located at some point on the line AB such as point D. Since point O is the center of the line AB, the distance OA equals the distance OB. Moving at a speed of slightly more than 186,000 miles per second, the radiation from either slave station A or slave station B travels a mile in 5.375 microseconds. Then if $t_0$ represents the instant at which a particular pulse is radiated from stations A and B, then the time $t_A$ at which a pulse from station A reaches a craft at point D is given by the equation $$t_A = t_0 + 5.375(AD)$$

but $$AD = -OA - (OD)$$
$$= OD - OA$$

hence $$t_A = t_0 + 5.375(OD) - 5.375(OA)$$

In the same fashion the time $t_B$ at which the same pulse sent out from station B is received at the point D is given by the equation $t_B = t_0 - 5.375(OD) - 5.375(OA)$.

The operation of the system depends on the value of a quantity $\Delta t$ whose value is given by the equation $\Delta t = t_A - t_B$. Substituting into this equation the values of $t_A$ and $t_B$ computed above, and combining terms, there results the equation $\Delta t = 10.75(OD)$.

Let us now examine the conditions required for the pulses received at the aircraft to be equally spaced. For the pulse repetition frequency of 4,650 pulses per second, the interval between successive transmitted pulses is 215 microseconds. For the received pulses to be equally spaced, $\Delta t$ must have a value of half as great, or $\Delta t = 107.5$. Substituting this value in the last equation and solving for OD gives a value of 10 miles for this quantity. Implicit in the foregoing discussion is the convention that a positive value of $\Delta t$ is used when the interval being measured is that by which the pulse from the station A precedes the pulse from station B. It will be obvious that if the craft is located at some point between O and B, the pulse from station B will precede the pulse from station A: in this case $\Delta t$ has a negative value, and the interval between the pulses can again be showed to be equal when $OD = -10$ miles, the negative sign here merely defining that the measurement is taken to the right of the point O rather than to the left.

Figure 5:
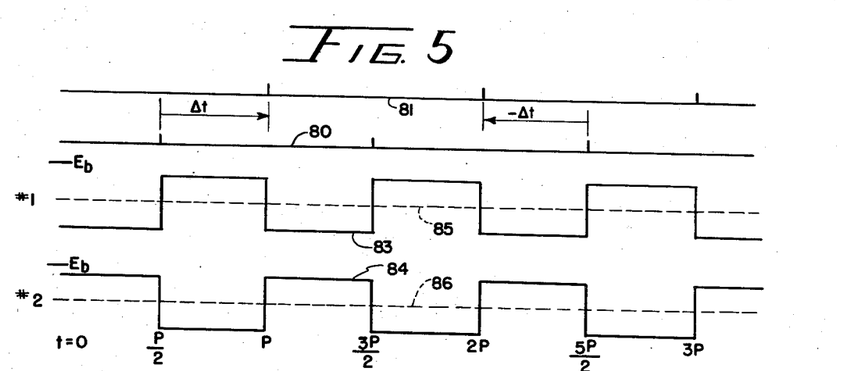

This state of affairs is illustrated in Figure 5, in which curve 80 represents the demodulated signal from station A supplied to computer 44 at 46, and curve 81 represents a similar demodulated signal supplied to computer 44 at 43. It is evident that the received pulses are equally spaced, a pulse from station A being followed by a pulse from station B etc. Here $\Delta t = -\Delta t$ since the process is a continuing, cyclic one.

Curves 83 and 84 of Figure 5 illustrate the operation of computer 44 before integration. As described in more complete detail in the Buehler patent referred to above, the computer includes a source of voltage of value $E_b$, a pair of integrators, and electron discharge tubes controlled by the pulses from the two stations to energize the integrators from the source. The arrangement is such that when an "A" pulse is received the A tube supplies high voltage to the A integrator and the B tube supplies low voltage to the B integrator. This condiion continues until a "B" pulse is received, when the B tube supplies high voltgae to the B integrator and the A tube supplies low voltage to the A integrator. This in turn continues until another A pulse is received, when the first condition is reestablished. The integrator outputs thus vary with the interpulse intervals.

The outputs of the A and B integrators are shown by dotted curves 85 and 86 in Figure 5, and are obviously equal for the equally spaced pulses. The integrator outputs are combined in opposition to give the output 55 from the computer 44 which is accordingly O at this time: no signal is therefore supplied through coupler 61 to influence automatic pilot 73.

Figure 6:
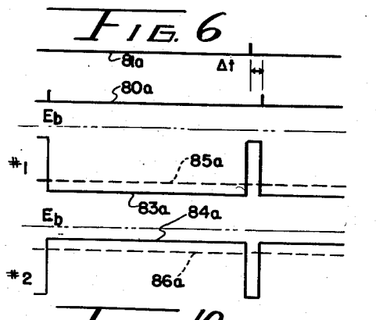

As the craft moves from the point where $\Delta t = 107.5$ microseconds toward the point O, the value of $\Delta t$ decreases. Figure 6 is a fragmentary diagram similar to Figure 5, for the case where $OD=-1.5$ miles. For this case, the same reference numerals have been used as in Figure 5, but with letter subscript: it is obvious that the output $85a$ of integrator A is less positive than the output $86a$ of integrator B, and a computer output appears at 55 determined in magnitude by the difference between $85a$ and $86a$ and in sense by the sense of the difference. Arbitrarily the output is defined as negative when $85a$ is less than $86a$.

Figure 7:
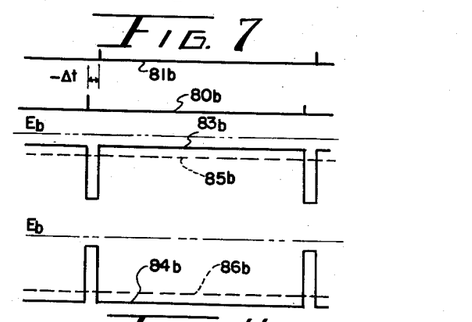

Figure 7 is a diagram similar to Figure 6, but represents the condition when the craft is on the other side of the point O, where $OD=-1.5$ miles. Here the magnitude of the output 55 from computer 44 is the same as in Figure 6, but its sense is just the opposite, being now positive.

Figure 10:
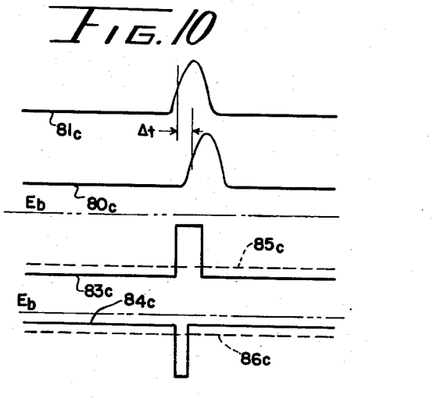
Figure 11:
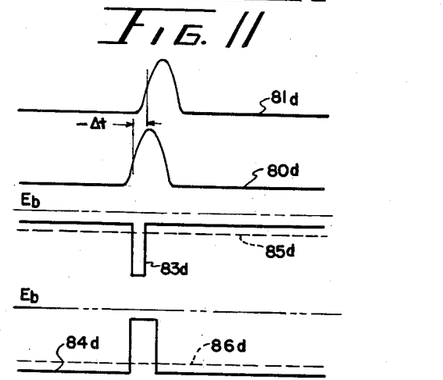

In Figures 5, 6 and 7 the pulses are shown merely as single vertical lines. This is permissible because the width of the pulses is negligible compared to the 215 microsecond interval between the successive pulses in each train. When the craft comes within 100 feet of the center point O, however, the value of $\Delta t$ is of the order of plus or minus 0.1 microsecond, and the pulse width can no longer be neglected. In one embodiment of the invention a pulse width of 0.25 microsecond, measured at 50% amplitude, has been found quite satisfactory, and two cases of this type are shown in Figures 10 and 11, for values of $\Delta t$ corresponding to $+100$ feet and $-100$ feet respectively for OD. The computer is set up to operate when the signals supplied at 46 and 43 reach the half amplitude of the respective pulses, and the operating time of the computer may for present purposes be considered negligible.

When the pulse of curve $81c$ reaches 50% amplitude, the voltage to the A integrator increases and that to the B integrator decreases, as before. When the pulse of curve $80c$ thereafter reaches 50% amplitude, the voltage to integrator B returns to its larger value, but the voltage to integrator A does not return to its smaller value until the A pulse drops below 50% amplitude. The same effect is shown to take place in reverse in Figure 11. This operation is inherent in the computer.

Figure 8:
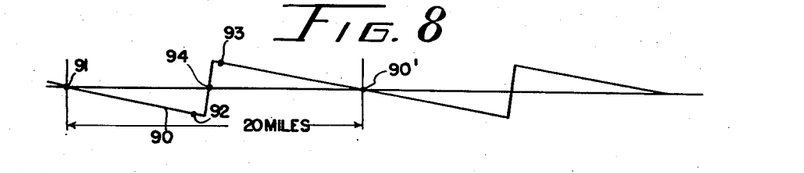

Curve 90 of Figure 8 illustrates the general manner in which $\Delta t$ (and hence the computer output) changes with distance of the craft from the point O. The case when $OD=-10$ miles is represented by the point 91, the case where $OD=-1.5$ miles by the point 92 and the case where $OD=-1.5$ miles by the point 93. It is to be noted that curve 90 is for the most part linear with a small negative slope, but that in the regions near the point 94 where $OD=O$ the curve reverses and has a large positive slope: for apparatus thus far described this slope would be infinite.

A preferred form for curve 90 in the region of point 94 is presented in enlarged form in Figure 9. One satisfactory method of producing such a curve is shown in Patent 2,514,369 referred to above, and comprises oppositely modulating the length of the pulses, after detection, in the aircraft. This changes the width of the pulse on curve $83c$ of Figure 10 and on curve $84d$ of Figure 11, and hence changes the computer output by changing the integrator outputs $85c$ in Figure 10 and $86d$ in Figure 11.

Figure 12:
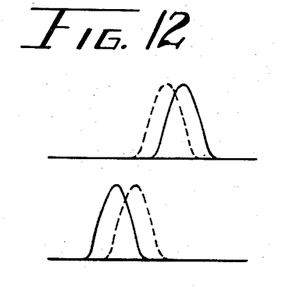
Figure 13:
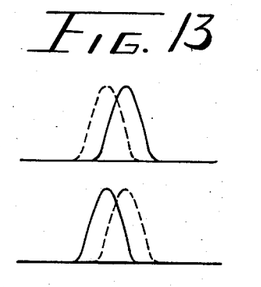
Figure 14:
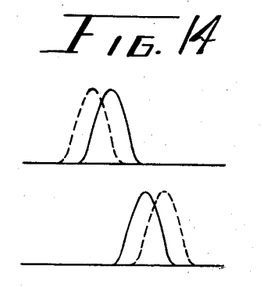

In the embodiment of the invention described herein, the same result is accomplished by time modulating the pulses transmitted from the master station at a frequency that is low relative to the pulse repetition frequency, and through a range that is smaller than the pulse width. This expedient considerably reduces the weight of the airborne equipment required to perform the desired function. It is at once apparent that if a craft is stationary at the point O, and the pulses are time modulated, pulse A precedes pulse B statistically one-half of the time, and pulse B precedes pulse A one-half of the time, so that the computer output is again O. On the other hand, if the craft is displaced from point O by more than a distance equivalent to the sum of pulse width plus amplitude of time modulation, the presence of the modulation is of no effect whatever on the operation of the apparatus. While the craft is within the narrow course limits, however, the effect of the modulation is to cause the A pulses to precede the B pulses more of the time when the craft is to the left of point O, and vice versa when the craft is to the right of point O. Figures 12 and 14 show the boundary cases limiting the useful area of the time modulation, and Figure 13 shows its operation when the craft is at the point O. At one instant in the cycle of oscillator 27 the pulses have a temporal relation shown by the solid outlines; 180° later in the cycle of the oscillator they have the temporal relation shown by the dotted outlines. Between these extremes there exist intermediate values whose number is determined by the ratio of the pulse repetition rate to the frequency of oscillator 27.

Essentially the purpose of the modulation is to convert a switching system to a proportioning system, so that the portion of curve 90 having a positive slope is changed from a vertical line passing through $OD=O$. If the time modulation is sinusoidal, such as is supplied by the oscillator 27, the form of this part of curve 90 is as shown in Figure 9.

Whether accomplished as described herein or as disclosed in the patent previously referred to, the arrangement provides a narrow path centered on the line QR within which very sensitive control of the craft may be had because of the relatively steep slope of the associated portion of curve 90. However, if the craft happens to be displaced outside this narrow path the sense of the control reverses, and path following is completely disrupted. Moreover, it is very difficult to bring a craft onto a path identified only by so narrow a radio signal. Control of the craft about a point such as point 91 on curve 90, on the other hand, is quite easy to establish, but is extremely loose and generally unsatisfactory because the slight slope of the curve makes the apparatus very insensitive. The function of the present invention is to make it possible to temporarily modify the operation of the system to give it the sensitivity and wide course characteristics prevailing at the point 91, although the craft is being directed to seek out the line QR, until the craft is sufficiently close to the desired line that the more rigorous control can be established and maintained.

The function just recited can be accomplished by delaying the pulses of one train by an interval corresponding to 10 miles of course width. This discovery is embodied in the present structure, by use of the time delay unit 50 of Figure 1, output 45 being supplied to computer 44 through this device. The signal supplied to the coupler when the craft is at point O is exactly the same as the signal supplied without device 50 when the craft is located at the point $OD=10$. As pointed out above, the presence of the time modulation is without effect in this part of curve 90, but it must be noted that the slope of the curve, and hence the control effect, is directly opposite. To take care of this, the output of computer 44 is reversed in its control effect by sense reverser 57 when time delay device 50 is being used.

Figure 3:
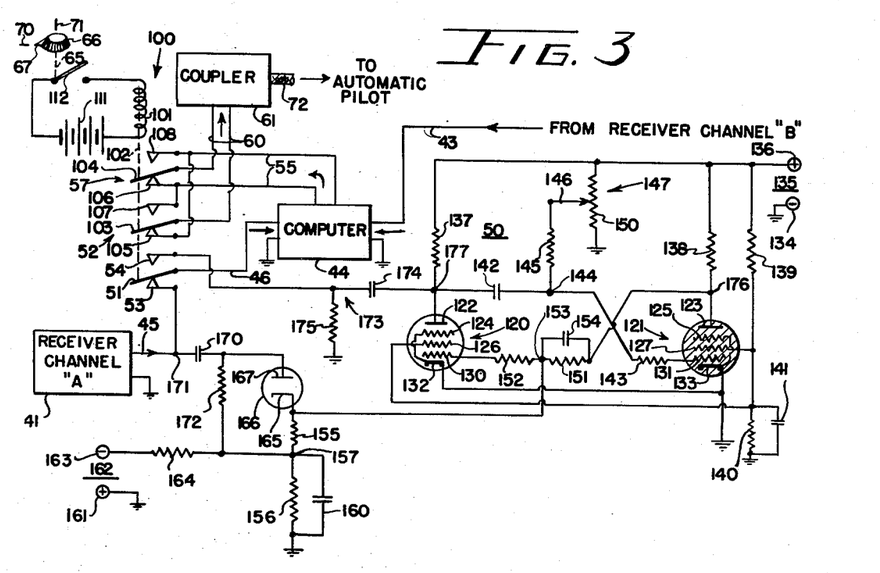
Figure 3 is a wiring diagram of a multivibrator time delay circuit as used in the practice of the invention.

The principles of delay multivibrators are generally known, but Figure 3 is presented to illustrate one suitable circuit, and its relation to the rest of the airborne equipment. In Figure 3 switch 52 and sense reverser 57 are combined in a relay 100 having a winding 101 energizable to actuate an armature 102, displacing movable contacts 51, 103 and 104 out of normal engagement with fixed contacts 53, 105, and 106 and into engagement with fixed contacts 54, 107, and 108 all respectively. Winding 101 is energized from a low voltage source 111 of electrical energy when a switch 12 is closed: the switch is actuated by knob 66 through mechanical connection 65, and is normally open in the narrow course condition of the apparatus.

Time delay device 50 is shown in Figure 3 to comprise a a pair of pentodes 120 and 121 having anodes 122 and 123, suppressor grids 124 and 125, screen grids 126 and 127, control grids 130 and 131, and cathodes 132 and 133, all respectively. The heaters of these tubes are not shown. The negative terminal 134 of a first high voltage source 135 is grounded: positive terminal 136 is connected to anodes 122 and 123 through resistors 137 and 138, and to screen grids 126 and 127 through a voltage divider made up of resistors 139 and 140, the latter being shunted by a filter capacitor 141. Cathodes 132 and 133 are grounded. Suppressor grids 124 and 125 are connected to cathodes 132 and 133 internally of the tubes as is conventional.

Anode 122 is connected to control grid 131 through a capacitor 142 and a resistor 143 having a common terminal 144: this latter terminal is connected through a resistor 145 to the slider 146 of a voltage divider 147 whose winding 150 is connected across source 135. Anode 123 is connected to control grid 130 through resistors 151 and 152 having a common terminal 153. A capacitor 154 is connected across resistor 151. Terminal 153 is connected to ground through resistors 155 and 156 having a common terminal 157: a capacitor 160 is connected across resistor 156. The positive terminal 161 of a second high voltage source 162 is grounded: the negative terminal 163 is connected to terminal 157 through a resistor 164. Terminal 153 is also connected to the cathode 165 of a diode 166 whose anode 167 is connected through a coupling capacitor 170 for energization at an input terminal 171 with the output of receiver channel A: a resistor 172 is connected between anode 167 and terminal 157.

Terminal 171 is connected to fixed contact 53 of relay 100. Fixed contact 54 is energized from anode 122 of pentode 120 through a differentiating network 173 including a capacitor 174 and a resistor 175. Movable contact 51 supplies input 46 to computer 44.

Contacts 103—108 are connected to act as a reversing switch interconnecting the output 55 of computer 44 and the input 60 of coupler 61, so that the computer signal can be impressed on the coupler in either of two opposite senses.

Sources 135 and 162 may conveniently supply equal voltages. Resistors 164 and 156, the latter shunted by capacitor 160, act as a voltage divider across source 162, determining the potential to ground of terminal 157. Similarly resistor 138 and the plate resistance of pentode 121, now in its conducting state, act as a voltage divider across source 135, determining the potential to ground of terminal 176. Resistor 155, shunted by resistor 172 and diode 166 in series, and resistor 151, shunted by capactor 154, act as a voltage divider across terminals 157 and 176, determining the potential to ground of terminal 153. The latter is connected to control grid 130 through isolating resistor 152, and the grid is normally at such a potential that pentode 120 is cut off.

Control grid 131 of pentode 121 is connected through limiting resistor 143 and dropping resistor 145 to the slider 146 of voltage divider 147, which during the steady state conditions determines a positive potential for control grid 131, and a higher positive potential for terminal 144. The grid current in pentode 121 acts as a load on the voltage divider, and also produces a voltage drop across resistor 143 to give a limiting action.

A further voltage divider connected across source 135 is made up of resistor 137 and the plate resistance of pentode 120; since the latter is at present in its nonconducting state, the potential to ground of terminal 177 is substantially that of terminal 136. Capacitor 142 connected between terminals 177 and 144 is accordingly given a normal charge, its left-hand electrode being positive with respect to its other electrode, although both are positive with respect to ground.

When a positive pulse is impressed between input terminal 171 and ground it is transmitted through diode 166 and is impressed on control grid 130 of pentode 120 and on anode 123 of pentode 121. The latter change is without significant effect, since pentode 121 is already conducting, but the former change causes pentode 120 to conduct, and the potential at terminal 177 drops because of the voltage drop in resistor 137 due to the anode current of the pentode. Since capacitor 142 cannot charge or discharge instantly, terminal 144 remains instantaneously at the same potential with respect to terminal 177 as previously, which means that its potential drops, with respect to ground, by the same amount as does terminal 177. Actually this results in terminal 144 going negative with respect to ground, and pentode 121 is cut off. The interruption of the anode current for pentode 121 through resistor 138 raises the potential of terminal 176 practically to that of terminal 136, and control grid 130 of pentode 120 is maintained positive from this source.

The drop in potential of terminal 144 described above is accompanied by an instantaneously large current through resistor 145 to discharge capacitor 142 exponentially, the discharge circuit including resistor 137 or pentode 120 and source 135, and slider 146. As the capacitor discharges the current in resistor 145 decreases, and the potential of terminal 144 approaches that of slider 146, which is positive with respect to ground. When terminal 144, and hence control grid 131, reaches the cutoff potential, pentode 121 can again conduct. The potential of terminal 176 again drops, and, since the triggering positive pulse on terminal 171 has disappeared, the potential of grid 130 also drops, cutting off pentode 120, and raising the potential of terminal 177 and hence of terminal 144, so that grid 131 goes temporarily more positive, maintaining conduction in pentode 121. As capacitor 142 recharges through the same path, the original condition is restored, and continues until a new positive pulse is received.

The period during which pentode 120 conducts is determined by the charge on capacitor 142 and the resistance of the discharged path. Both are affected by the setting of slider 146, which thus determines the delay between the instant at which a positive pulse appears at terminal 171 and the instant at which the resulting charge of pentode 121 is cut off and terminal 177 again becomes positive.

The positive pulse on terminal 153, resulting when pentode 121 is cut off, is prevented from being fed back to terminal 171 by diode 166, which is non-conductive in this direction.

The voltage at anode 122 is a square wave output, as is conventional in multivibrators of this type. The square wave is differentiated in network 173 to provide a negative pulse synchronized with the initial positive pulse supplied by receiver 41, and a subsequent positive pulse. The interval between the negative and positive pulses is determined principally by the magnitudes of resistor 145 and capacitor 142 and by the position of slider 146, for any set of values for sources 135 and 162: in the present structure these parameters are chosen to give a delay of 107.5 microseconds.

In one operative embodiment of the invention the following values were found satisfactory:

Source 111_____________________ 28 volts D. C.
Sources 135 and 162_____________ 130 volts D. C.
Pentodes 120 and 121____________ 6AN5.
Diode 166______________________ CK5704.

Resistors:
    137, 138 _______________________ 5,000 ohms.
    139 ___________________________ 22,000 ohms.
    140 ___________________________ 2,200 ohms.
    143, 152 _______________________ 10 ohms.
    145 ___________________________ 1,450,000 ohms.
    151 ___________________________ 220,000 ohms.
    155, 172 _______________________ 68,000 ohms.
    156 ___________________________ 10,000 ohms.
    164 ___________________________ 51,000 ohms.
    175 ___________________________ 4,700 ohms.
Winding 150 _______________________ 25,000 ohms.
Capacitor:
    141 ___________________________ 4,700 mmfd.
    142, 174 _______________________ 100 mmfd.
    154 ___________________________ 50 mmfd.
    160 ___________________________ 10,000 mmfd.
    170 ___________________________ 2,000 mmfd.

*Operation*

The mode of operation of the apparatus embodying the invention should now be clear. When it is desired to control a craft by radio so that it flies along a particular path such as the line QR of the Figure 4, a master station and two slave stations are so located with respect to the course to be flown, that an aircraft located exactly on the desired path will receive pulses from the two slave stations at exactly the same time. This may be done alternatively either by exactly positioning the stations, or by providing the stationary equipment with adjustable delays to bring about the desired result. The aircraft to be controlled is equipped with the apparatus shown in Figures 1 and 3, and this apparatus and the ground station apparatus is set into operation. The aircraft is brought within ten miles of the path to be followed, by any desired navigation procedure, and switch 112 of Figure 3 is closed, energizing relay 100. The direct connection from receiver 41 to computer 44 is now interrupted by movable contact 51, and the connection is completed through time delay circuit 50, which is energized from the receiver. At the same time the output of computer 44 is reversed in sense to bring about the desired control effect on the automatic pilot through coupler 61.

Each time a positive pulse is supplied at 45 from receiver 41, differentiating network 173 of the time delay circuit supplies a negative pulse, followed after an interval of 107.5 microseconds by a positive pulse. Both of these pulses are impressed on computer 44, but the computer is of such a character that a negative pulse has no effect upon it.

Unless the craft is exactly on the line QR, an output is supplied from computer 44 which depends in magnitude and sense on the amount and displacement of the craft from the desired line. The signal is available for use for almost ten miles on each side of the center line, and it acts to direct the craft to a position on the line. By the time the craft is within 100 feet of the line on one side or the other thereof, the control signal has diminished to practically zero, and the human pilot may now open switch 112, by turning knob 66 to its "narrow" position. When this is done, the control effect of the computer output is reversed, and the receiver output from channel A is connected directly to the input of the computer: although the delay multivibrator is not disconnected from the receiver, its output is disconnected from the computer. The computer output now varies in accordance with the departure of the craft from the desired line, but reaches its maximum value when the craft is only 100 feet from the center line. There is thus established a very sensitive control of the craft to follow the desired line.

Numerous objects and advantages of my invention have been set forth in the foregoing description, together with details of the structure and function of the invention, and the novel features thereof are pointed out in the appended claims. The disclosure, however, is illustrative only, and I may make changes in detail within the principle of the invention to the full extent indicated by the broad general meaning of the terms in which the appended claims are expressed.

I claim as my invention:

1. Control apparatus comprising, in combination: means supplying a signal, in a craft to be controlled, which varies cyclically about a central value with displacement of the craft from a path to be followed, the cycle of variation consisting of a short portion having a steep slope of a first polarity and a long portion having a gradual slope of the opposite polarity; an automatic pilot for controlling the direction of movement of the craft in accordance with the sense and magnitude of said signal relative to said central value; means normally supplying said signal to said automatic pilot in a first fashion such that when the craft is on the desired path the signal is at the center of the short portion of its cycle; and means operable to reverse the sense of the control exerted by said automatic pilot, and to simultaneously supply said signal to said automatic pilot in a second fashion such that when the craft is on the desired path the signal is at the center of the long portion of its cycle.

2. Control apparatus comprising, in combination: means supplying, in a craft to be controlled, first and second signals having a characteristic varying with the distances from the craft to a pair of points oppositely equidistant from a path to be followed by the craft; means for combining said signals to provide a voltage which normally varies cyclically about a central value with displacement of the craft from the path, the cycle of variation consisting of a short portion having a steep slope of a first polarity and a long portion having a gradual slope of the opposite polarity; connecting means normally supplying said first and second signals to said signal combining means in a first fashion such that when the craft is on the desired path said voltage is at the center of the short portion of its cycle; and means included in said connecting means and actuable to alter the characteristic of one of said signals, before supplying it to said combining means, in such a fashion that when the craft is on the desired path said voltage is at the center of the long portion of its cycle.

3. Control apparatus comprising, in combination: means supplying, in a craft to be controlled, first and second pulse trains whose timing relative to that of a standard pulse train is in each case a measure of the distance from the craft to one of a pair of fixed points oppositely equidistant from a path to be followed by the craft; means for deriving from said pulse trains a voltage which varies cyclically about a central value with displacement of the craft from the path, the cycle of variation consisting of a short portion having a steep slope of a first polarity and a long portion having a gradual slope of a second polarity; connecting means normally supplying said pulse trains to said last named means in a first fashion such that when the craft is on the desired path said voltage is at the center of the short portion of its cycle; and means included in said connecting means and actuable to delay one of said pulse trains by an interval equal to half the period of said cycle, so that when the craft is on the desired path said voltage is at the center of the long portion of its cycle.

4. Control apparatus comprising, in combination: means supplying, in a craft to be controlled, first and second pulse trains whose timing relative to that of a standard pulse train is in each case a measure of the distance from the craft to one of a pair of fixed points oppositely equidistant from a path to be followed by the craft; means for deriving from said pulse trains a voltage which varies cyclically about a central value with displacement of the craft from the path, the cycle of variation consisting of a short portion having a steep slope of a first polarity and a long portion having a gradual slope of a second polarity; connecting means normally supplying said pulse trains to said last named means in a first fashion such that when the craft is on the desired path said voltage is at the center of the short portion of its cycle; further means included in said connecting means and actuable to delay one of said pulse trains by an interval equal to half the period of said cycle, so that when the craft is on the desired path said voltage is at the center of the long portion of its cycle; an automatic pilot for normally controlling the direction of movement of the craft in accordance with the sense and magnitude of said voltage; and means operable to reverse the sense of the control exerted by said automatic pilot and to simultaneously actuate said further means.

5. Control apparatus comprising, in combination: computing means determining the phase relationship between corresponding pulses of two pulse trains, having the same pulse repetition frequency and varying in phase with the distances from a craft to two fixed points, and deriving therefrom an output which varies cyclically about a mean value as the craft changes its relative distances from said fixed points, a short portion of the cycle of said output varying rapidly in a first sense, and a long portion of said cycle varying slowly in the opposite sense; craft control means for steering the craft in accordance with the sense and magnitude of said output relative to said mean value; connecting means for supplying said output to said craft control means; means for modifying said computing means in such a manner that when the craft is at a location which would normally result in an output at the center of the rapidly varying portion of said cycle, the output is actually that at the center of the slowly varying portion; means causing reversal in sense of the control exercised by said control means; and means for simultaneously causing operation of said two last named means.

6. Apparatus of the class described comprising, in combination: computing means for determining the phase relationship between corresponding pulses of two pulse trains, having the same pulse repetition frequency and varying in phase with variation in a pair of quantities which jointly determine the value of a condition to be controlled, and deriving therefrom an output which varies cyclically about a mean value in accordance with concurrent acyclic change in said quantities, a short portion of the cycle of said output varying rapidly in a first sense, and a long portion of said cycle varying slowly in the opposite sense; control means for causing change in said condition in accordance with the sense and magnitude of said output relative to said mean value; connecting means for supplying said output to said control means; means for modifying said computing means in such a manner that when said condition has a value which would normally result in an output at the center of the rapidly varying portion of said cycle, the output is actually that at the center of the slowly varying portion; means causing reversal in sense of the control exercised by said control means; and means for simultaneously causing operation of said two last named means.

7. Apparatus of the class described comprising, in combination: computing means for determining the phase relationship between corresponding pulses of two pulse trains, having the same pulse repetition frequency and varying in phase with variation in a pair of quantities which jointly determine the value of a condition to be controlled, and deriving therefrom an output which varies cyclically about a mean value in accordance with concurrent acyclic change in said quantities, a short portion of the cycle of said output varying rapidly in a first sense, and a long portion of said cycle varying slowly in the opposite sense; control means for causing change in said conditions in accordance with the sense and magnitude of said output relative to said mean value; connecting means for supplying said output to said control means; means for delaying the pulses of one of said trains by an amount equal to one half the pulse repetition frequency, so that when said condition has a value which would normally result in an output at the center of the rapidly varying portion of said cycle, the output is actually that at the center of the slowly varying portion; means causing reversal in the sense of the control exercised by said control means; and means for simultaneously causing operation of said two last named means.

8. Apparatus of the class described comprising, in combination: computing means for determining the phase relationship between corresponding pulses of two pulse trains, having the same pulse repetition frequency and varying in phase with variation in a pair of quantities which jointly determine the value of a condition to be controlled, and deriving therefrom an output which varies cyclically about a mean value in accordance with concurrent acyclic change in said quantities, a short portion of the cycle of said output varying rapidly in a first sense, and a long portion of said cycle varying slowly in the opposite sense; control means for causing change in said condition in accordance with the sense and magnitude of said output relative to said mean value; connecting means for supplying said output to said control means; multivibrator time delay means effective upon the pulses of one of said trains in such a manner that when said condition has a value which would normally result in an output at the center of the rapidly varying portion of said cycle, the output is actually that at the center of the slowly varying portion; means causing reversal in sense of the control exercised by said control means; and means for simultaneously causing operation of said two last named means.

9. Apparatus of the class described comprising, in combination: computing means for determining the phase relationship between corresponding pulses of two pulse trains, having the same pulse repetition frequency and varying in phase with variation in a pair of quantities which jointly determine the value of a condition to be controlled, and deriving therefrom an output which varies cyclically about a mean value in accordance with concurrent acyclic change in said quantities, a short portion of the cycle of said output varying rapidly in a first sense, and a long portion of said cycle varying slowly in the opposite sense; control means for causing change in said condition in accordance with the sense and magnitude of said output relative to said mean value; connecting means for supplying said output to said control means; means for modifying said computing means in such a manner that when said condition has a value which would normally result in an output at the center of the rapidly varying portion of said cycle, the output is actually that at the center of the slowly varying portion; means reversing the sense of the output of said computing means; and means for simultaneously causing operation of said two last named means.

10. Control apparatus comprising, in combination: means supplying first and second trains of pulses having the same repetition frequency and time-modulated, in 180° phase relationship, at a frequency less than the repetition frequency of the trains and through a maximum excursion which is small compared to the repetition period of the pulses, the mean interval between corresponding pulses in said trains varying in accordance with deviation of a condition from a desired value; a computer having a pair of input circuits adapted to receive trains of pulses, and an output circuit which supplies an output except when the pulses applied to said input circuits occur either simultaneously or at equally spaced intervals, the sense and magnitude of said output otherwise varying with inequality in successive intervals betwen said pulses; first connecting means applying said first named pulse trains to said input circuit; control means for performing a function in accordance with an output of the type supplied by said computer; second connecting means supplying the output of said computer to said control means; means included in said first connecting means for delaying the pulses of one of said trains by an amount equal to half the pulse repetition period; means included in said second connecting means for reversing the sense of said computer output; and means operable between a first position, in which said two last named means are rendered effective, and a second position, in which said two last named means are rendered ineffective.

11. Aircraft control apparatus comprising, in combination: radio receiving means supplying first and second trains of pulses having the same repetition frequency and time-modulated, in 180° phase relationship, at a frequency less than the repetition frequency of the trains and through a maximum excursion which is small compared to the repetition period of the pulses, the mean interval between corresponding pulses in said trains varying in accordance with departure of a dirigible craft from a desired path; a computer having a pair of input circuits adapted to receive trains of pulses, and an output circuit which supplies an output except when the pulses applied to said input circuits occur either simultaneously or at equally spaced intervals, the sense and magnitude of said output otherwise varying with inequality in successive intervals between said pulses; first connecting means applying said first named pulse trains to said input circuits; control means for directing the craft in accordance with an output of the type supplied by said computer; second connecting means supplying the output of said computer to said control means; means included in said first connecting means for delaying the pulses of one of said trains by an amount equal to half the pulse repetition period; means included in said second connecting means for reversing the sense of said computer output; and means operable between a first position, in which said two last named means are rendered effective, and a second position, in which said two last named means are rendered ineffective.

12. Control apparatus comprising, in combination: computing means determining the phase relationship between corresponding pulses of two pulse trains, having the same pulse repetition frequency and varying in phase with the distances from a craft to two fixed points, and deriving therefrom an output which varies cyclically about a mean value as the craft moves away from one point and toward the other, a first portion of the cycle of said output varying rapidly in a first sense, and a second portion of said cycle varying slowly in the opposite sense; craft control means for steering the craft in accordance with the sense and magnitude of said output relative to said mean value; connecting means for supplying said output to said craft control means; means for delaying the pulses of one of said trains by an interval equal to one half the pulse repetition period, so that the full effect of said control means is exerted during said first portion of said cycle; means in said connecting means operable to reverse the sense of said output; and mean for simultaneously causing operation of said two last named means, so that the full control effect of said control means is exercised through said second portion of said cycle.

13. Control apparatus comprising, in combination: computing means determining the phase relationship between corresponding pulses of two pulse trains, having the same pulse repetition frequency and varying in phase with the distances from a craft to two fixed points, and deriving therefrom an output which varies cyclically about a mean value as the craft moves away from one point and toward the other, a first portion of the cycle of said output varying rapidly in a first sense, and a second portion of said cycle varying slowly in the opposite sense; craft control means for steering the craft in accordance with the sense and magnitude of said output relative to said mean value; connecting means for supplying said output to said craft control means; multivibrator means for delaying the pulses of one of said trains by an interval equal to one half the pulse repetition period, so that the full effect of said control means is exerted during said first portion of said cycle; means in said connecting means operable to reverse the sense of said output; and means for simultaneously causing operation of said two last named means, so that the full control effect of said control means is exercised through said second portion of said cycle.

14. Aircraft control apparatus comprising, in combination: means supplying a pair of pulse trains having the same repetition frequency, the time relation between corresponding pulses of the two trains being opposite for opposite displacements of an aircraft from a desired path; control means for steering the aircraft in one direction for a first time relation between said corresponding pulses and in the opposite direction for the opposite time relation between said pulses; means for reversing the sense of the steering action performed by said control means for said opposite time relations between said corresponding pulses; means for delaying the pulses of one of said trains by 180 degrees; and means for simultaneously initiating operation of said two last named means.

15. In aircraft control apparatus including means supplying a pair of pulse trains having the same repetition frequency, the time relation between corresponding pulses of the two trains being opposite for opposite displacements of an aircraft from a desired path, control means for steering the aircraft in opposite directions for signals of opposite senses, and coupling means connected to said two first named means for supplying a signal of one sense to said coupling means for one time relation between said corresponding pulses and supplying a signal of the opposite sense to said control means for the opposite time relation between said corresponding pulses, the improvement which comprises means for reversing the sense of the signals supplied by said coupling means for each said time relation, means delaying the pulses of one of said trains by 180 degrees, and means for simultaneously causing operation of the two last named means.

References Cited in the file of this patent
UNITED STATES PATENTS

| | | |
|---|---|---|
| 2,514,369 | Buehler | July 11, 1950 |
| 2,604,620 | McCutchen et al. | July 22, 1952 |